United States Patent [19]

Wade et al.

[11] Patent Number: 4,609,561

[45] Date of Patent: Sep. 2, 1986

[54] FROZEN AERATED FRUIT JUICE DESSERT

[75] Inventors: Bill R. Wade; Thelma L. Wade, both of Farmington, Wash.

[73] Assignee: Olympus Industries, Inc., Spokane, Wash.

[21] Appl. No.: 759,821

[22] Filed: Jul. 26, 1985

Related U.S. Application Data

[63] Continuation-in-part of Ser. No. 681,248, Dec. 13, 1984.

[51] Int. Cl.$^4$ .............................................. A23G 9/00
[52] U.S. Cl. ................................. 426/565; 426/567; 426/599
[58] Field of Search ............... 426/599, 495, 590, 565, 426/76, 567, 575, 577, 654, 116

[56] References Cited

U.S. PATENT DOCUMENTS

| | | | |
|---|---|---|---|
| 2,977,231 | 3/1961 | Fox et al. | 426/116 |
| 3,949,098 | 4/1976 | Bangert | 426/599 |
| 4,293,580 | 10/1981 | Rubenstein | 426/599 |
| 4,551,341 | 11/1985 | Blanie et al. | 426/495 |

*Primary Examiner*—Jeanette Hunter
*Attorney, Agent, or Firm*—Oldham, Oldham & Weber

[57] ABSTRACT

A frozen, aerated fruit juice dessert made entirely from natural products contains at least one fruit juice source in association with 0.1 to 10 percent by weight of various stabilizers based upon the total weight of the mix. An amount of water and other ingredients is such that the blend has a brix value of from about 10 to about 35 and for more desirable results of 20 to 35. No refined sugar or corn sweetener is contained in the blend. Moreover, the juice is frozen to form a soft frozen dessert on the order of soft ice cream or yogurt.

25 Claims, No Drawings

FROZEN AERATED FRUIT JUICE DESSERT

CROSS REFERENCE TO RELATED APPLICATION

This application is a continuation-in-part of application Ser. No. 681,248 filed Dec. 13, 1984.

TECHNICAL FIELD

The present invention relates to a fruit juice mix for whipped and/or frozen applications which is essentially free from non-vegetable ingredients. More specifically, the present invention relates to a fruit juice mix for whipped and/or frozen applications having a brix value of from about 10 to about 35 and generally 20 to 30 and containing various combinations of juices and stabilizers therein and preferably containing on a dry weight basis about 25 to 45 percent fructose, about 10 to 30 percent glucose, and no more than about 10 percent of other sweeteners of the sacchride class, i.e. essentially free of refined sugars and corn sweeteners. Particularly, this invention relates to more storage-stable fruit juice mixes and the gaseous products thereof wherein at least one of the juices may have been subjected to treatment with an ion exchange resin or ultrafiltration to give a more stable juice mixture.

BACKGROUND ART

Fruit juices including mixtures are available on the market in various forms such as unsweetened and sweetened, frozen and unfrozen, including concentrated and fully diluted. These fruit juices, in the frozen state, are characterized generally as exhibiting a crystalline structure in many cases that breaks into layers or lamina which frequently exhibits a needle-like structure with the crystals being most noticeable. Thus, these commercial frozen juices can, with their needle-like crystal structure, cause injury to the mouth. On the other hand, the frozen juices sold with a stick frozen therein are described as being quiescent in nature but exhibit the harsh feel in the mouth of crystalline ice or needles as contrasted with the soothing feel of the instant whipped or frozen product. The prior art teaches of how to avoid or reduce the above disadvantages and have generally added solids for the purpose of aiding the sweetening and freezing of the juices where these solids or additives are other than fruit juice origin and contains refined sugar, corn sweeteners, and the like, including artificial colors and flavors.

After World War II there was an upsurge in popularity of soft frozen ice cream and drinks, which led to a desire to produce a soft frozen all-natural fruit juice. This desire has not been adequately attained because those who practiced the prior art found natural fruit juice would not produce a product acceptable to the consumer. When a person eats a frozen product, the taste buds are partially anesthetized and the juice concentrate has to be diluted to about single strength and then, to attain desired sweetness, high potency sweetners or dextrose, sucrose, fructose, lactose and similar sugars are used which in turn deleteriously affects the brix of the concentrate.

The present invention relates to a fruit juice mix which, in the whipped and/or frozen state, exhibits the absence from the mass of a unitary or essentially a unitary crystalline lattice network having shear planes less than about 0.1 up to about 0.5 centimeter in length. More particularly, the present invention relates to a fruit juice mix capable of being whipped and/or frozen having a brix value of from about 10 to about 35 and generally 20 to 30 with various combinations of juice or juices, natural flavoring and stabilizers to give a whipped and/or frozen mass having a soothing, satisfying feel and taste in the mouth.

A specific embodiment of this invention relates to use of ion exchange treated and/or ultrafiltrated juice or juices to give mixtures having improved storage stability at ambient to freezing temperatures and permitting products such as drinks and frozen creams to be made from a storage stable mix where the mix may have a flavor characteristic of the red, orange and yellow juices that are more difficult to tore without losing their fresh taste.

DISCLOSURE OF INVENTION

It is therefore an aspect of the present invention to provide a fruit juice mix for whipped and/or frozen applications containing essentially natural components.

It is a further aspect of the present invention to provide a fruit juice mix for whipped and/or frozen applications, as above, wherein said fruit juice can be frozen and is edible as such and is characterized in that the frozen mix is very short crystalline and non-lattice structured, viz., does not exhibit clevage planes through several centimeters of thickness as exhibited by the commercial frozen fruit juice sold under the Popsicle trademark.

It is another aspect of the present invention to provide a fruit juice mix for whipped and/or frozen applications containing natural components, as above, wherein said mix has a sweetness value of from about 20 brix to about 35 brix and generally 20 to 30 and preferably, on a dry basis, a fructose content of 25 to 45 percent, a glucose content of 10 to 30 percent, and no more than about 10 percent of other sweeteners of the sacchride class and has a freezing range of preferably from about 24° F. to 0° F. with the most preferred range being 10° F. to 20° F.

It is yet a further aspect of the present invention to provide a fruit juice mix for whipped and/or frozen applications, as above, containing stabilizers therein, for example guar gum, locust bean gum, carrageenan, and the like.

It is a further aspect of the present invention to provide a fruit juice mix for whipped and/or frozen applications, as above, containing vegetable proteins such as soy protein concentrate, or enzyme modified soy protein concentrate, which is used to improve and control the whipability, creaminess and texture of the finished product.

It is a still further aspect of the present invention to provide a fruit juice mix for whipped and/or frozen applications, as above, wherein various spices, natural flavors, and tartness additives can be utilized.

It is a further aspect of the present invention to provide a fruit juice mix for whipped and/or frozen applications, as above, wherein water is used to regulate the brix level and adjust solids to proper freezing and sweetness levels to permit them to be consummed without further dilution.

A special embodiment hereof having the aspect of providing novel drinks and creams either . whipped, frozen, thickened or cultured with the flavor and appearance of a juice having the colors such as the red, orange or yellow juices of strawberries, oranges or peaches.

These and other aspects of the present invention will become apparent from the following detailed description of the invention in view of the Background Art.

In general, a fruit juice mixture, comprises: at least one type of fruit juice; from about 0.05 percent to about 1.5 percent by weight of at least one stabilizer based upon the total weight of said mixture, said stabilizer being derived from a natural source; from about 0.05 percent to about 0.15 percent by weight of a soy protein based upon the total weight of said mixture; an amount of remaining ingredients including water such that said mixture has an overall brix value of from about 10 to about 35, and said blend being free of sugar and corn sweetener additives.

BEST MODE FOR CARRYING OUT THE INVENTION

A fruit juice mixture essentially contains all natural ingredients. By natural ingredients it is meant that it is obtained from a fruit, vegetable or related edible plant by crushing, squeezing and related operations, then filtered, strained, passed through a sieve, resin beds, clay or diatomaceous earth bed or filters, ion exchanged resins to give a juice, a juice concentrate, purees, and concentrates or so-called modified juices. The fruit juice mixture generally may be frozen and edible as such, that is either as a soft serve, hard frozen, or novelty form such as frozen on a stick. The mixture contains at least one type of fruit juice although a combination of various juices as well as types thereof can be utilized. By the term fruit juice it is meant any type of juice which is extracted from fruit by any conventional means such as pressing. That is, the juice itself contains types of saccharides preferably a majority of monosacchrides which naturally occurs in that type of juice, as extracted from plants by any one of the well known methods. Specific types of juices which can be utilized in the present invention include fruit juice, concentrated fruit juice, fruit puree, fruit puree concentrated, juices which have been modified, that is modified juice, as well as modified concentrated juice and the like. Modified juices would include ion exchange treated and/or ultrafiltrated juices. Examples of a few of the many secific juices which can be utilized in the present invention include peach concentrate, pear concentrate, blackberry puree, cranberry juice, orange juice concentrate, grape concentrate, and apple juice concentrate. Of course, many other types of juices whether in the form of a puree, concentrate, or a juice can be utilized depending upon the desired end flavor.

The type of juice source, such as fruit juice, fruit juice concentrate, fruit puree, fruit puree concentrate, fruit juice concentrated puree, modified juice as well as their concentrates has a sweetness due to the natural saccharide content contained therein. The degree of sweetness is generally listed by a brix value. Brix is generally defined as the percent of soluble solids primarily made up of natural sugars. The fruit juice mixture, or frozen soft serve material of the present invention, generally has an overall brix value of from about 10 to about 35 generally the range will be 20 to 35, once the other ingredients, such as water, stabilizers, natural flavors and the like, as noted hereinbelow, have been added to the juices. In other words, a sufficient amount of water and the like is added to dilute the concentrated juice from the source such that it has a brix value of from about 10 to about 35 and generally 20 to 35. A blend having a brix value of 35 or greater generally tends to be too sweet and is difficult to freeze. On the other hand, the juice mixture having a brix value of less than 10 generally tends to be too sour as well as too icy when frozen. A more desirable brix range is from about 20 to about 27 with 23 to 26 being preferred. The brix value of approximately 25 is optimum for most juices. These brix values are obtained without the use of lactose or refined sugar or corn sweeteners, as is the practice in making ice cream.

Stabilizers are used in the present invention to give body as well as good texture and improve stability of overrun and melt down to the overall mixture. The stabilizers are derived from natural sources such as plants and the like, although some of the stabilizers may have been modified in order to render them stable and food-grade functional or clean. In other words, the stabilizers as a whole are not artificial or synthetically made. Examples of stabilizers which are utilized and generally preferred in the present invention include guar gum, locust bean gum, and carrageenan. In addition to these basic types of stabilizers, other types can be utilized such as various alginates which are generally made from seaweed, various cellulose gums, xanthan gum, various pectins, and the like. Such stabilizers are well known to those skilled in the art as well as the literature. The stabilizers render the juice mix uniform and also tend to control the size and the consistency of the mix when frozen. That is, a creamy consistency is generally obtained.

The total amount of all stabilizers utilized is generally from about 0.05 percent to about 1.5 percent by weight based upon the weight of the entire juice mix. Lesser amounts tend to result in separation of the various ingredients whereas higher amounts tend to result in a very viscous mixture which is difficult to mix. A more desirable range is from about 0.2 to about 1.0 percent by weight with approximately 0.35 to about 0.60 being preferred. Generally, the amount of each individual stabilizer utilized is approximately the same. Thus, if the amount of an individual stabilizer utilized is reduced, it is usually compensated by the use of a similar increased amount of another stabilizer so that the overall amount generally remains the same. Typically, the total amount of guar gum utilized is approximately 5 gms./gal. to about 10 gms./gal. with from about 0.14 percent to about 0.18 percent of this gum being preferred. The amount of locust bean gum utilized as well as the carrageenan is from about 0.17 to about 0.29 percent with from about 0.10 percent to about 0.14 percent of this gum being preferred. The remaining stabilizer, such as the alginate, the cellulose gum as well as the pectin are used in similar amounts as above.

Another ingredient which is utilized is vegetble protein such as soy protein. Generally, any modified type of soy protein can be utilized. The purpose of the soy protein is to improve and control the whipability of the fruit juice mix for whipped and/or frozen applications to make it creamier. It thus enhances the overrun upon whipping of the frozen material to take up air such that a creamier, ice cream like or whipped cream type consistency is achieved. The amount of soy protein is generally from about 0.05 percent to about 0.5 percent, with from about 3 to about 13 grams per gallon of formulation being utilized. Approximately 4 to 6 or 7 grams is highly preferred.

As noted above, the overall fruit juice mix which is generally whipped and/or frozen and served as such contains a particular fruit juice and/or natural flavor to impart a particular flavor to the overall mixture. Also, this particular fruit juice can affect the freezing point. The various stabilizers are utilized to give a creamy consistency as well as to stabilize the syrup. The soy protein, as noted above, enhances the whipping ability to yield a soft serve frozen mixture. The amount of water will vary over a wide range, depending on the concentration of the juice mixtures to bring the product to the desired brix range.

Other ingredients which may be utilized are natural flavors and/or spices to establish standardized optimum flavor levels for said flavor. Examples of flavor enhancers include nutmeg and cinnamon in small amounts such as from about 0.05 percent to about 0.07 percent by weight, and natural flavors derived from concentrates of essential oils or botanicals essences. Naturally, other specialty type ingredients can also be utilized in similar amounts. Any natural flavoring ingredient can be used to make flavors, ranging from tropical fruits, pumpkin, to pizza, if desired.

Generally, small amounts of various flavor modifiers, generally acids, can be utilized to impart tartness, enhance flavor, prevent oxidation of the ingredients or the like. For example, citric acid and other organic acids such as malic acid may be utilized to impart tartness or accentuate the flavor of the mixture. The amounts of such acids generally range from about 0.15 to 0.8 percent by weight apart from the levels of total acids from juice sources, etc. The titratable acidity of the mix would generally range from 0.15 to 0.8 percent. In order to prevent oxidation of the ingredients, commonly called browning, ascorbic acid can be utilized as in an amount from about 0.02 to about 0.10 weight percent, and preferably from about 0.05 percent to about 0.08 percent by weight based upon the total weight of the overall fruit juice mixture.

The mixing procedure for forming the fruit juice mix is generally as follows:

The primary fruit juice or concentrate thereof, such as pear juice concentrate, is added to a makeup tank. Next, all of the remaining fruit juices or concentrates, viz., modified or puree, are added. Then all the remaining liquid ingredients, including purees, flavors, and the like are added and mixed for approximately 5 minutes or more depending on size of mixture and efficiency of the mixing equipment. Approximately 75 percent by weight of the water is added holding out a sufficient amount of water to be utilized in mixing with the stabilizers. One-half of the withheld water is usually at about 10° C. to about 37° C. and the stabilizer is slowly added thereto, generally maintaining a good vortex in the stabilizer mixing tank. After the stabilizer has been thoroughly dispersed and no lumps are contained therein, usually about 10 minutes, the water dispersion of the stabilizer is slowly added to the water diluted mix and thoroughly incorporated therein. The balance of the water is used to wash out the stabilizer mixing tank and to ensure all the stabilizer is transferred to the diluted juice tank. The last water addition is stirred to give a uniform mix. This mix may be refrigerated to await containerization in suitable shipping packaging. Before packaging, the mix is raised to commercial sterilization temperature, about 183° F. to about 205° F. for about 2 minutes to about 8 seconds at high temperature and then cooled and aseptically packaged to await use or shipment to the use point. Alternatively, the product at about 183° F. to 205° F. is added to the container and the closed container is then cooled to the storage temperature in what is generally called the hot pack system to await use or shipment to the use point.

At the consumption point, the juice is poured into a machine known to the ice cream trade as an ice cream type making machine or frost stirrer mixer. Here it is cooled and frozen as well as whipped to produce a frozen flavorable mixture of either soft serve or hard frozen mixture, depending on the temperature and the time in the machine and the equipment being used. Those of ordinary skill in the ice cream trade will immediately see other apparatus that could be used to process the juice mixes of this invention, including the whipped creams and soft and hard frozen creams.

It has been found that such machines provide sufficient air whipped into the fruit juice mixture to give a smooth texture and having a temperature of minus 40° to 10° C. and an expansion of volume of said fruit juice mixture of 20 to 200 percent (50–55 percent being preferable) by volume.

The invention will be better understood by reference to the following representative and illustrative examples where all parts and percentages are by weight unless otherwise designated.

EXAMPLE 1

A grape flavored mixture was made utilizing the above described mixing procedure having the following formulation:

| GRAPE SOFT SERVE | |
| --- | --- |
| Ingredients | Formula g/Gallon |
| Pear Concentrate 71° Brix | 946.17 |
| Grape Concentrate 52° Brix | 660.60 |
| Stabilizer | |
| Guar gum, locust bean gum, carrageenan | 17.00 |
| Water | 2539.09 |
| Soy Protein | 5.00 |
| Malic Acid | 6.20 |
| | 4174.06 |
| Brix | 25.0 ± 1.0 |
| pH | 3.8 ± 0.1 |
| Titratable acid | .45 ± .02 |

The recipe may be mixed, frozen and processed in any machine designed to freeze ice cream or yogurt to give a frozen aerated mix having a very good, soft consistency and a delicious flavor.

EXAMPLE 2

An apple flavored fruit juice mixture was prepared in accordance with the above mixing procedure having the following formula:

| APPLE SOFT SERVE | |
| --- | --- |
| Ingredients | Formula g/Gallon |
| Apple Juice Concentrate 72° Brix | 1415.08 |
| Stabilizer | |
| Guar gum, locust bean gum, carrageenan | 17.00 |
| Cinnamon (optional) | 2.15 |
| Nutmeg (optional) | 0.5 |
| Water | 2734.27 |

APPLE SOFT SERVE -continued

| Ingredients | Formula g/Gallon |
|---|---|
| Soy Protein | 5.0 |
| | 4173.55 |
| Brix | 25.0 ± 1.0 |
| pH | 3.95 ± 0.10 |
| Titratable acid | 0.60 ± 0.02 |

Generally, the various flavors have a good consistency, are soft as of the nature of frozen yogurt or ice cream, and have an overall good natural cinnamon flavored taste.

As is apparent from the above examples, it should be appreciated that numerous other formulations and flavors can be made within the scope of the present invention utilizing all natural ingredients, including juices, purees, modified juices and the like, natural stabilizers, soy protein, natural flavor, water and the like.

When using the so-called modified juices such as juices that have been passed through an ion exchange resin to contact the juice with the resin which removes color bodies, readily oxidized or unstable bodies and the weak fruit acids, it is desired to use the mixing procedure of Example 3. As is well known, absorbants such as charcoal or special carbons as well as the absorbent resins such as the well known anion and cation resins and porous membranes or packing of ultrafiltration methods are used to purify juice products. In the instant invention, optimization of the acid-sweetness ratio and removal of color and flavor are achieved by this same technique. We have discovered that juices which have been subjected to an absorbent treatment of about 10° C. to about 60° C. and filtering away of the absorbent or permitting the juice to flow away from the resin or porous membrane or packing offers unique opportunities for making products having unique properties such as storage stability at temperatures above the freezing temperature of the juice mixture. Also, the modified juices are excellent for enhancing or fortifying the mixture. Specifically, a relatively long life strawberry, peach or orange drink is possible where the drink can be held at room temperature in a manner simulating the practice with aseptic packed apple and/or pear juice or white or purple grape juice.

EXAMPLE 3

In batch mixing equipment of appropriate size, 1050 parts of water was metered into the make-up tank. A juice and flavor concentrate (about 2800 parts) was charged to the make-up tank with the mixer running to form a juice mix. The juice and flavor concentrate comprised about equal parts of deionized apple and/or pear juice of 71° brix and peach puree of 9.5° brix with about 70 parts of natural peach flavor.

In a small mixing kettle 400 parts of water was added before the dry ingredients slowly were added and mixed therein to give a stabilizer solution. The dry ingredients used were 18–19 parts of stabilizers and/or gums, 5 to 6 parts of soy protein and 0.5 to 1.5 parts of ascorbic acid. The stabilizer solution was pumped to the make-up tank and mixed with the juice mix. Then about 400 parts of water was added to give the final juice mixture having a brix of about 25, a pH of about 4.3.

This juice mixture was heat treated at about 90°–95° C. for about half a minute, cooled and packed in aseptic containers such as about 6.5 liter bags and stored or shipped to the customer. At the customer's the juice mixture was charged to an ice soft-freeze machine to form a soft creamy all-fruit juice, peach flavored frozen cream that could be sold and eaten like ice cream. The taste and flavor was good and simulated the taste of peaches. Also, this peach juice mixture could be aseptically sealed in a paper carton such as those described in U.S. Pat. Nos. 3,347,444 or 4,287,247 and be kept under cooling for several days or a week before being consumed. Actually, it could be held for a few days at room temperature before being consumed. Thus, this specific embodiment provides a strawberry, peach or orange flavored all-fruit drink or cream.

EXAMPLE 4

The procedure of Example 3 was repeated except instead of peach, a strawberry juice mixture was prepared using strawberry flavor at 44.7 brix. This strawberry juice mixture could be stored and consumed as a drink or could be frozen to give a strawberry soft or hard cream with excellent acceptance.

EXAMPLE 5

The procedure of Example 3 may be used with deionized apple juice 72° brix to form a peach flavored juice mixture or with the procedure of Example 4 to produce a strawberry juice mixture. It should be appreciated that either high acid or low acid apple juice may be used with suitable adjustment of the acid level to give a titratable acid level within range of 0.4 to 0.7 and a pH of preferably 3.5 to about 4.6.

Instead of deionized juice of Example 3, a juice which has been subjected to ultrafiltration may be used to produce products of this invention.

While in accordance with the patent statutes, a best mode and preferred embodiment have been set forth, the invention is to be measured by the scope of the attached claims.

What is claimed is:

1. A frozen fruit juice cream having at least 50 percent overrun and being eaten as frozen, comprising:
   at least one type of fruit juice;
   from about 0.05 percent to about 1.5 percent by weight of at least one stabilizer based upon the total weight of said cream, said stabilizer being derived from a natural source;
   from about 0.05 percent to about 0.15 percent by weight of a vegetable protein based upon the total weight of said cream;
   an amount of water and including remaining ingredients selected from the group consisting of flavoring, spices, flavor enhancers, organic acids, and mixtures thereof such that said cream has an overall brix value of from about 10 to about 35, and said cream being free of added sugar and corn sweetener additives.

2. A fruit frozen juice cream according to claim 1, wherein said stabilizers are selected from the group consisting of guar gum, locust bean gum, xanthan gum, carrageenan, an alginate, a cellulose gum, a pectin, and combinations thereof.

3. A fruit frozen juice cream according to claim 1, wherein said juice type is selected from the group consisting of fruit juice, fruit juice coentrate, fruit puree, fruit puree concentrate, modified juice, modified juice concentrate, and combinations thereof.

4. A fruit frozen juice cream according to claim 3, wherein the overall amount of said stabilizers is from about 0.35 percent to about 0.60 percent by weight.

5. A frozen fruit juice cream according to claim 4, wherein said stabilizers are guar gum, locust bean gum, and carrageenan, and wherein the amount of said guar gum ranges from about 0.14 to about 0.24 percent by weight, wherein the amount of said locust bean gum ranges from about 0.17 to about 0.29 percent by weight, and wherein the amount of carrageenan ranges from about 0.1 to about 0.14 percent by weight.

6. A frozen fruit juice cream according to claim 5, wherein the overall brix value of said mixture is from about 23 to about 26.

7. A frozen fruit juice cream according to claim 6, wherein the amount of vegetable protein ranges from about 0.05 to about 0.15 percent by weight.

8. A frozen fruit juice cream according to claim 1 wherein the organic acid is selected from the group consisting of citric acid, malic acid, and ascorbic acid and other organic acids inherent in fruits.

9. The frozen fruit juice cream of claim 1, wherein the contents of the cream is at least, on a dry basis, about 25 percent to about 45 percent fructose and about 30 percent to 10 percent glucose, and no more than 10 percent of other sweeteners of the saccrose class.

10. The frozen fruit juice cream of claim 1 wherein at least one of the juices present has been contacted with an ion exchange resin or subjected to ultrafiltration.

11. The frozen fruit juice cream of claim 10 wherein a flavoring ingredient has been added to compliment any flavor removed by contact of the juice with the ion exchange resin or ultrafiltration.

12. The frozen fruit juice cream of claim 2 wherein sufficient acid is added to adjust the mixture's tartness and pH to about 3.5 to about 5.5.

13. The frozen fruit juice cream of claim 1 wherein the fruit juice has been ultrafiltrated.

14. A soft frozen fruit juice cream comprising:
a fruit juice mixture having sufficient air whipped therein to give a smooth texture and having a temperature of minus 40° to 10° C. and an expansion of volume of said fruit juice mixture of 20 to 200 percent by volume, said fruit juice mixture including at least one fruit juice;
from about 0.05 percent to about 1.5 percent by weight of at least one stabilizer based upon the total weight of said mixture, said stabilizer being derived from a natural source of gums;
from about 0.05 percent to about 0.5 percent by weight of a vegetable protein based upon the total weight of said mixture;
an amount of water and including remaining ingredients selected from the group consisting of flavoring, spices, flavor enhancers, and organic acids, and mixtures thereof such that said mixture has an overall brix value of from about 10 to about 35, and said mixture being free of added sugar and corn sweetener additives.

15. The cream, according to claim 14, wherein said stabilizers are selected from the group consisting of guar gum, locust bean gum, carrageenan, an alginate, a cellulose gum, a pectin, and combinations thereof.

16. The cream, according to claim 14, wherein said juice type is selected from the group consisting of fruit juice, fruit juice concentrate, fruit puree, fruit puree concentrate, modified juice, modified juice concentrate, and combinations thereof.

17. The cream, according to claim 14, wherein the overall amount of stabilizers is from about 0.02 percent to about 0.6 percent by weight.

18. The cream of claim 14 wherein said mixture has a brix value of 23 to 27 at the time it is frozen to give a cream having a high overrun.

19. A soft frozen cream comprising
a fruit juice mixture having sufficient air or gas incorporated therein to give an overrun volume of at least about 55 percent, said mixture being
a mixture of at least one juice that has been contacted with an ion exhange resin, or ultrafiltrated,
from about 0.05 to about 0.5 percent by weight of at least one stabilizer and
about 0.3 percent of a whipping agent on a total solid basis, said juice mixture having a brix of 20° to 30°.

20. A soft frozen fruit juice cream comprising:
a juice modified by deionizing or ultrafiltraing, and
a concentrate or a puree of fruit juice and a flavoring,
0.05 to 1.5 percent by weight of a stabilizer,
0.05 to about 0.5 percent of a vegetable protein whipping agent for the specific juice, and
sufficient water to give the mixture a brix of 10° to 35°.

21. The soft frozen fruit juice cream of claim 20 wherein the concentrate or puree is strawberry or peach and the juice modified is apple or pear.

22. The cream of claim 21 wherein the modified juice comprises at least a major portion of said cream.

23. The cream of claim 22 wherein a vitamin is added to the cream.

24. A frozen fruit juice cream, comprising:
at least one type of fruit juice;
from about 0.05 percent to about 1.5 percent by weight of at least one stabilizer based upon the total weight of said cream;
from about 0.05 percent to about 0.15 percent by weight of an added protein based upon the total weight of said cream;
an amount of water and including remaining ingredients selected from the group consisting of flavoring spices, flavor enhancers and organic acids and mixtures thereof such that said mixture has an overall brix value of from about 10 to 35, and said brix mixture being free of added sugar and corn sweetener additives and having overrun of at least 50 percent wherein said frozen fruit juice product cream has a smooth creamy appearance.

25. A smooth frozen edible product, comprising:
a fruit juice mixture having a brix value of 10 to about 35, said fruit juice mixture comprising or including at least one type of fruit juice;
from about 0.05 percent to about 1.5 percent by weight of at least one stabilizer based upon the total weight of said mixture;
from about 0.05 percent to about 0.15 percent by weight of added protein based upon the total weight of said mixture and added water to give said brix value; and
said mixture being free of added sugar and corn sweetener additives and containing sufficient air incorporated therein to effect an expansion of volume of said fruit juice mixture of 20 to 150 percent.

* * * * *

REEXAMINATION CERTIFICATE (937th)
United States Patent [19]
Wade et al.

[11] B1 4,609,561
[45] Certificate Issued  Oct. 25, 1988

[54] FROZEN AERATED FRUIT JUICE DESSERT

[75] Inventors: Bill R. Wade; Thelma L. Wade, both of Farmington, Wash.

[73] Assignee: Olympus Industries, Inc., Spokane, Wash.

Reexamination Request:
No. 90/001,301, Jul. 27, 1987

Reexamination Certificate for:
Patent No.: 4,609,561
Issued: Sep. 2, 1986
Appl. No.: 759,821
Filed: Jul. 26, 1985

Related U.S. Application Data

[63] Continuation-in-part of Ser. No. 681,248, Dec. 13, 1984.

[51] Int. Cl.⁴ ................................................ A23G 9/00
[52] U.S. Cl. .................................... 426/565; 426/567; 426/599
[58] Field of Search ............... 426/565, 566, 567, 599

[56] References Cited
PUBLICATIONS

"Frozen Fruit Juice Has Ice Cream Texture", *Food Engineering*, Jun. 1977, pp. 22, 23, 26.
Staley Protein Division Formula, Dec. 1976.
Frosty Fruit Whipped Orange Juice Dessert, 1975.
Sweetheart Formulas/Costs/Packaging Sheet Formulas 1978–1979 (E-I).
Fruit Juices with Reduced Color & Flavor Replace Sugar in Many Foods, *Prepared Foods*, Mar. 1985.
Palmer, M., "Ingredients Play Natural Role", *Dairy Field*, May 1984.

*Primary Examiner*—Jeanette Hunter

[57] ABSTRACT

A frozen, aerated fruit juice dessert made entirely from natural products contains at least one fruit juice source in association with 0.1 to 10 percent by weight of various stabilizers based upon the total weight of the mix. An amount of water and other ingredients is such that the blend has a brix value of from about 10 to about 35 and for more desirable results of 20 to 35. No refined sugar or corn sweetener is contained in the blend. Moreover, the juice is frozen to form a soft frozen dessert on the order of soft ice cream or yogurt.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-25 is confirmed.

* * * * *